(12) United States Patent
Heselhaus (10) Patent No.: US 7,500,709 B2
(45) Date of Patent: Mar. 10, 2009

(54) FOLDING TOP FOR A CONVERTIBLE AND CONVERTIBLE COMPRISING A FOLDING TOP

(75) Inventor: Udo Heselhaus, Ibbenbüren (DE)

(73) Assignee: Wilhelm Karmann GmbH, Osnabruck (DE)

( * ) Notice: Subject to any disclaimer, the term of this patent is extended or adjusted under 35 U.S.C. 154(b) by 209 days.

(21) Appl. No.: 11/547,218

(22) PCT Filed: Mar. 17, 2005

(86) PCT No.: PCT/DE2005/000485

§ 371 (c)(1),
(2), (4) Date: Sep. 29, 2006

(87) PCT Pub. No.: WO2005/095137

PCT Pub. Date: Oct. 13, 2005

(65) Prior Publication Data

US 2007/0194596 A1 Aug. 23, 2007

(30) Foreign Application Priority Data

Mar. 31, 2004 (DE) .................. 10 2004 015 666

(51) Int. Cl.
*B60J 7/12* (2006.01)
(52) U.S. Cl. .................. 296/107.07; 296/107.09; 296/107.12
(58) Field of Classification Search ............ 296/107.01, 296/107.07, 107.09, 107.12, 116, 117, 120.1
See application file for complete search history.

(56) References Cited

U.S. PATENT DOCUMENTS

| 4,693,509 A | 9/1987 | Moy et al. |
| 4,784,428 A | 11/1988 | Moy et al. |
| 5,788,316 A | 8/1998 | Rothe |
| 6,422,637 B1 | 7/2002 | MacFarland |
| 6,454,342 B2 * | 9/2002 | Heselhaus et al. ...... 296/107.07 |
| 6,513,857 B2 * | 2/2003 | Pfertner et al. ......... 296/107.07 |
| 6,536,831 B2 * | 3/2003 | Rothe et al. ............ 296/107.07 |
| 6,578,898 B2 * | 6/2003 | Rothe et al. ............ 296/107.07 |
| 2002/0024230 A1 | 2/2002 | Pfertner et al. |
| 2002/0074822 A1 | 6/2002 | Rothe et al. |

(Continued)

FOREIGN PATENT DOCUMENTS

DE 3808910 A1 * 10/1989

(Continued)

*Primary Examiner*—Glenn Dayoan
*Assistant Examiner*—Paul A Chenevert
(74) *Attorney, Agent, or Firm*—Michael Best & Friedrich LLP (57) ABSTRACT

A folding top for a convertible vehicle comprises a rigid rear window assembly (24) and a top framework with side frame parts (10, 12, 14, 40) for supporting a roof covering (16), which parts are at least partially retractable into a rear portion (29) of the vehicle. At least a rear area of the roof covering, which is affixed to the rear window (26) and to the rearmost side frame part (40), is made of a flexible material. The rearmost side frame part is connected via a linkage (44, 50, 54, 56) with the rear window assembly such that the distance between the rearmost side frame part and the side edge of the rear window passes through a maximum shortly before reaching the fully closed position of the folding top, whereby the tensioning of the flexible material counteracts against an opening of the folding top.

20 Claims, 10 Drawing Sheets

U.S. PATENT DOCUMENTS

2002/0158485 A1  10/2002  Obendiek
2004/0046415 A1* 3/2004  Heselhaus .............. 296/107.12
2006/0125282 A1* 6/2006  Theuerkauf ............ 296/107.07

FOREIGN PATENT DOCUMENTS

| DE | 43 09 607 | 9/1994 |
|----|-----------|--------|
| EP | 1024042 A2 | 8/2000 |
| GB | 918909 | 2/1963 |

* cited by examiner

FOLDING TOP FOR A CONVERTIBLE AND CONVERTIBLE COMPRISING A FOLDING TOP

CROSS-REFERENCE

This application is the US national stage filing of International Application Ser. No. PCT/DE2005/000485 filed Mar. 17, 2005, which claims priority to German patent application No. 10 2004 015 666.2 filed Mar. 31, 2004.

TECHNICAL FIELD

The invention concerns a folding top for a convertible vehicle and a convertible vehicle having such a folding top.

BACKGROUND ART

A retractable motor vehicle top having an intrinsically rigid roof segment, which is disposed essentially rearward of the passenger compartment and comprises a rear window, is known from EP 1092579 B1. During opening of the top, the intrinsically rigid rear roof segment, which is borne on the vehicle body by means of a lever linkage, pivots rearwardly and downwardly, so that, in the opened position of the top, the rear segment is accommodated in a folding top accommodation space defined in the rear portion of the vehicle and the remaining portion of the roof is located over it in a folded-together manner, wherein a forward, rigid roof segment and the rear, rigid roof segment are pushed together by folding a middle roof segment that is made of textile material and connects the forward, rigid roof segment and the rear, rigid roof segment.

A convertible vehicle having a folding top including a flexible roof covering with a dimensionally-stable rear window is known from DE 100 29 472 A1, whose top framework includes a rear-sided tensioning bow, on which the rear window is directly supported; the tensioning bow forms a structural unit together with a frame that connects the rear window to the flexible roof covering. During opening of the top, the structural unit as a whole is pivoted downwards into a folding top compartment. For the purpose of further lowering the assembly into the top compartment, brackets project from the tensioning bow downwardly in the closed position, which brackets are borne on the vehicle body via levers. So that the structural unit is pivoted during opening of the top, the structural unit is connected with the top framework via levers that engage the upper portions of the side edges of the rear window.

A problem presented by the known top lies in that the roof covering, which is preferably made from a cloth material, is tensioned by the tensioning bow and the tensioning of the top cloth material is insufficient between side frame parts and the rear window edge, which can cause crease formation, ripples or also, at high speed, fluttering.

SUMMARY

The object underlying the invention is to further develop a folding top of this kind, such that, by means of a simple construction, a defect-free tensioning is ensured in the closed state of the folding top also in the areas adjacent to the rear window. A further object underlying the invention is to provide a convertible vehicle having such a folding top.

In a preferred aspect of the present teachings, a folding top for a convertible vehicle preferably comprises an intrinsically rigid rear window assembly that is adapted to be pivotably borne on both sides of a vehicle body. The folding top also preferably comprises a top framework having side frame parts that are adapted to be pivotably mounted on both sides of the vehicle in the area rearward of the vehicle passenger compartment. The side frame parts preferably support both sides of a roof covering in the closed state of the folding top. Furthermore, during opening of the folding top, the side frame parts are adapted to move such that the side frame parts are at least partially retractable into a rear portion of the vehicle together with the roof covering and the downwardly pivoted rear window assembly. At least a rear area of the roof covering, which is affixed on the upper edge and the side edges of a rear window and on the rearmost side frame part, is made of flexible material. More preferably, each of the rearmost of the side frame parts is connected via a linkage with the rear window assembly such that a distance between the rearmost side frame part and the side edge of the rear window passes through a maximum shortly before the fully closed position of the top. Consequently, the tensioning of the flexible material of the roof covering acting between the side edge of the rear window and the adjacent side frame part counteracts against an opening of the top.

Thus, according to the inventive folding top, the areas of the flexible roof covering located adjacent to the rear window are tensioned between the side window edge and the side frame parts that laterally enclose the folding top in a desirable manner, so that a defect-free appearance of the top is ensured.

BRIEF DESCRIPTION OF THE DRAWINGS

In the following, the invention will be explained in further detail in an exemplary manner with the assistance of the schematic drawings.

DETAILED DESCRIPTION OF THE INVENTION

In the present application, the expressions "forward" and "rearward" respectively refer to the driving direction of a vehicle. "Right" and "left" mean the right and left sides, respectively, in the forward direction of the vehicle.

Figure 1:
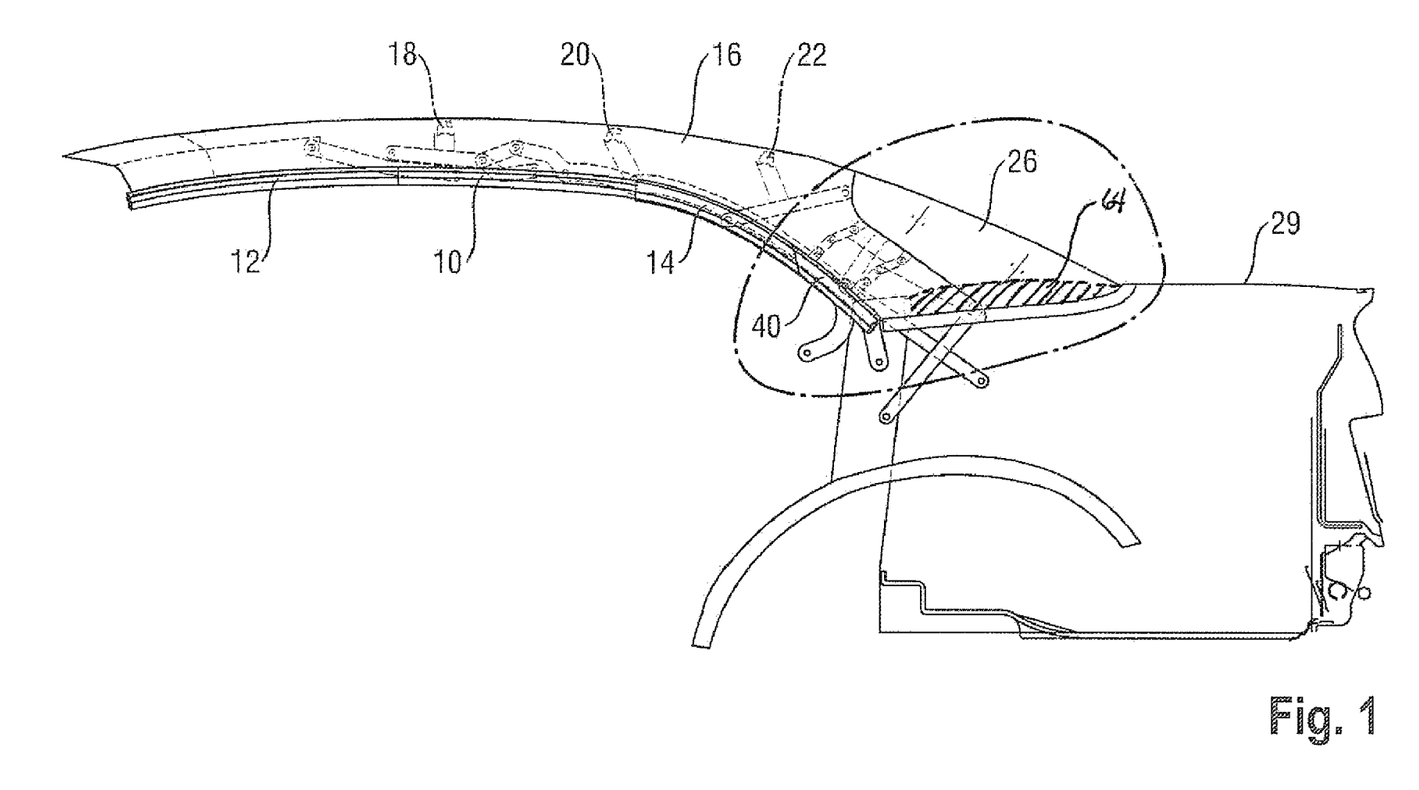
FIGS. 1 to 4 show schematic side views of the inventive folding top in four different positions with only implied illustration of actuation levers.

FIG. 1 is a schematic view of a part of a convertible vehicle, wherein the entire top is visible together with a rear portion of the vehicle. The top mechanism is provided on the right and left sides of the vehicle in a mirror-image arrangement with respect to the longitudinal middle plane of the vehicle. Only the left-side top mechanism is illustrated.

Figure 2:
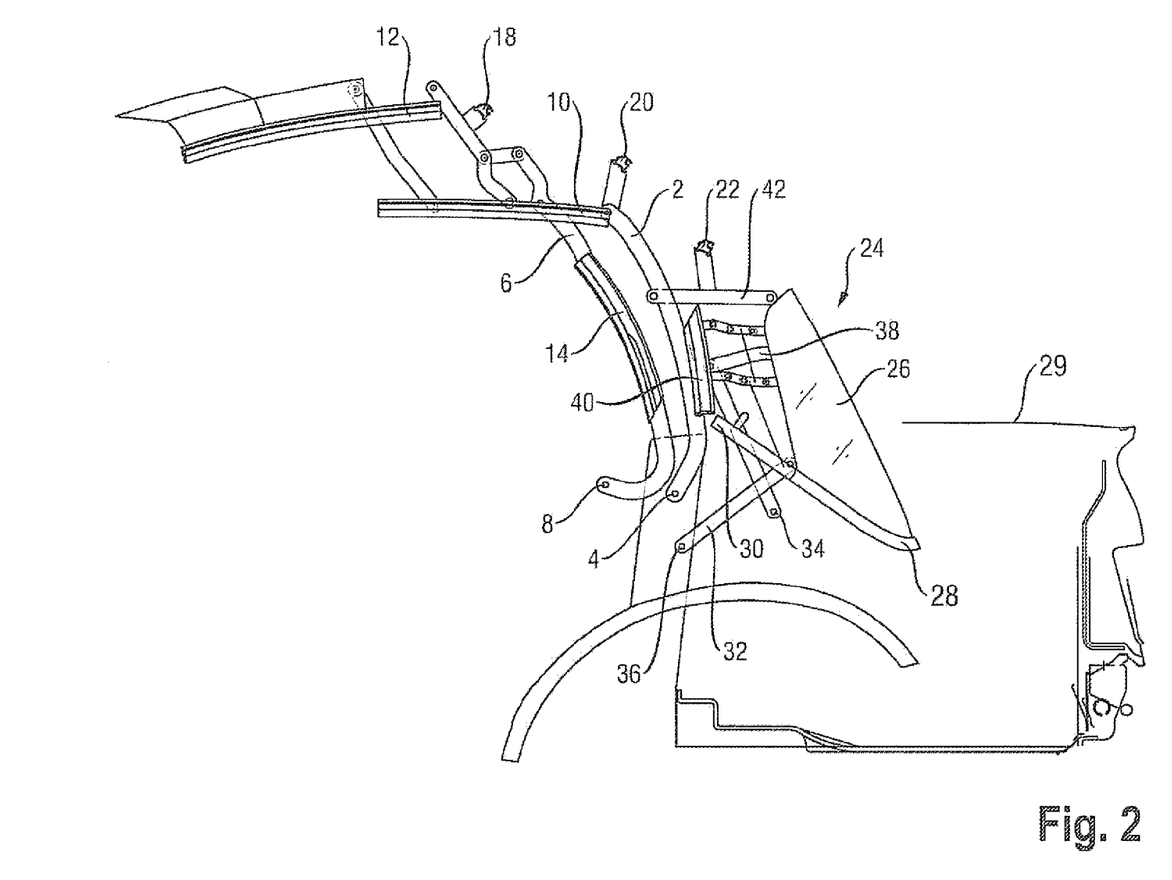
Figure 3:
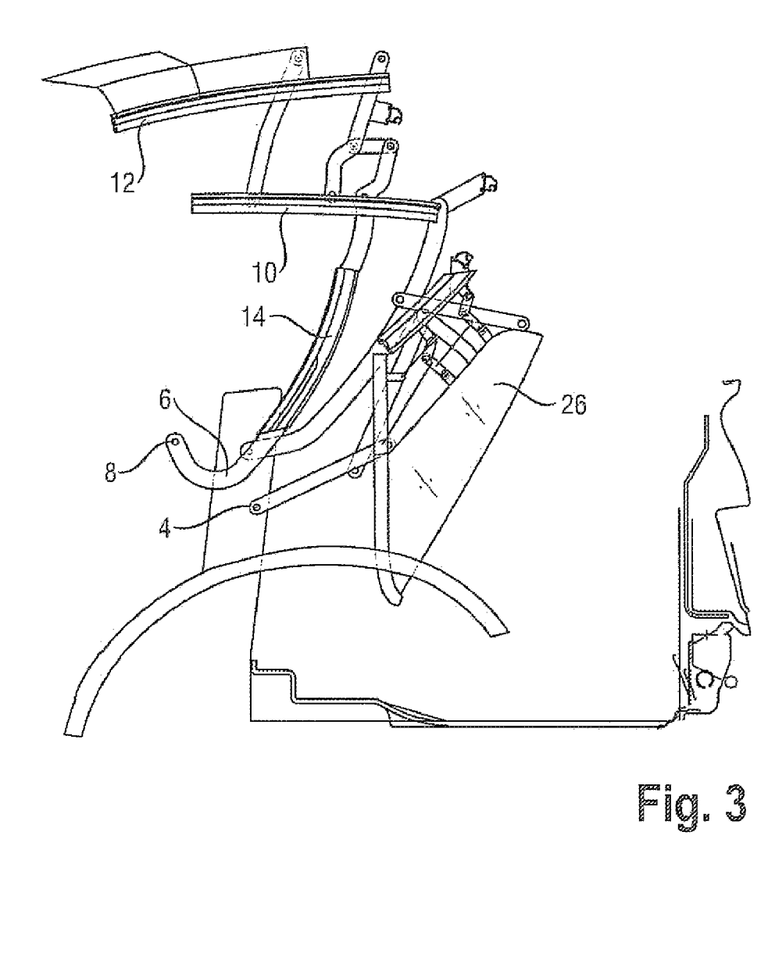
Figure 4:
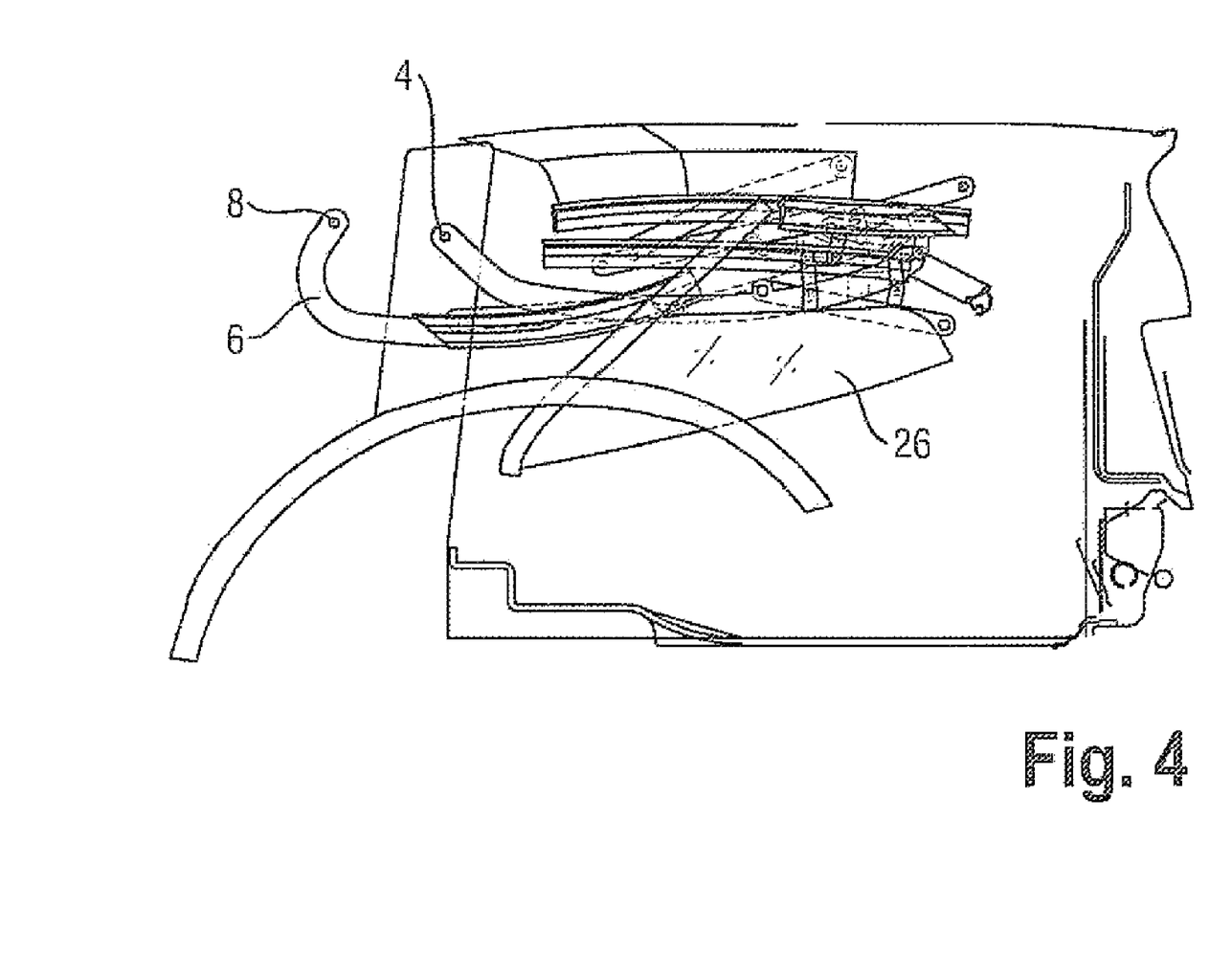

FIGS. 1 to 4 show the top in various positions, wherein FIG. 1 illustrates the closed top and FIG. 4 illustrates the fully-opened top and FIGS. 2 and 3 illustrate intermediate positions.

With respect to the following description of the individual parts, attention will be particularly directed to FIGS. 2 and 3, in which the individual parts are especially visible.

The top framework comprises a first frame lever 2, which is borne in a bearing 4 in a manner affixed to the vehicle, and a second frame lever 6, which is borne at 8 in a manner affixed to the vehicle. A side frame part 10 is borne on the first frame lever 2; the side frame part 10 is hingedly connected with the second frame lever 6 and, via additional levers, with a side frame part 12. Said components collectively form a scissor framework in a known manner that assumes a position in the fully extended position such that the frame parts 12, 10 and an additional frame part 14, which is formed by a portion of the second frame lever 6, are located one after another in a serial arrangement and form a side edge of the roof in its closed state, the roof spans the passenger compartment in the form of a flexible roof covering 16, e.g. in the form of a textile fabric, and is supported by transverse roof support bows 18, 20 and 22.

An intrinsically rigid rear window assembly 24, which adjoins the rear of the top, comprises an intrinsically rigid, preferably relatively large area and three-dimensionally curved, rear window 26; the lower edge of the rear window 26 is retained on a tensioning bow 28 that, in the closed state, adjoins the top to a rear trunk lid 29 and, if applicable, to vehicle body side parts.

The tensioning bow 28 and the rear window 26 form an intrinsically rigid composite structure, wherein in the illustrated example the lower edge of the rear window 26 does not extend along the entire length of the tensioning bow 28, so that the lateral sides of the tensioning bow 28 end at tensioning arms 30 that respectively project from the side edges of the rear window 26 substantially in the forward direction of the vehicle when the folding top is closed.

The rear window assembly 24 is pivotably borne on the vehicle body by means of a four-hinge mechanism that comprises a first articulated lever 32 and a second articulated lever 34. The first articulated lever 32 is coupled to the tensioning arm 30 near the side edge of the rear window 26 and is borne on the vehicle body in a bearing 36, which is located, in the closed state of the top (FIG. 1), below and in front of the bearing on the tensioning arm. The second articulated lever 34 is borne on a bracket 38 that rigidly projects from the upper area of the side edge of the rear window 26 in the direction towards a rearmost side frame part 40. The other end of the second articulated lever 34 is borne on the vehicle body rearward and preferably somewhat above the bearing 36.

Figure 6:
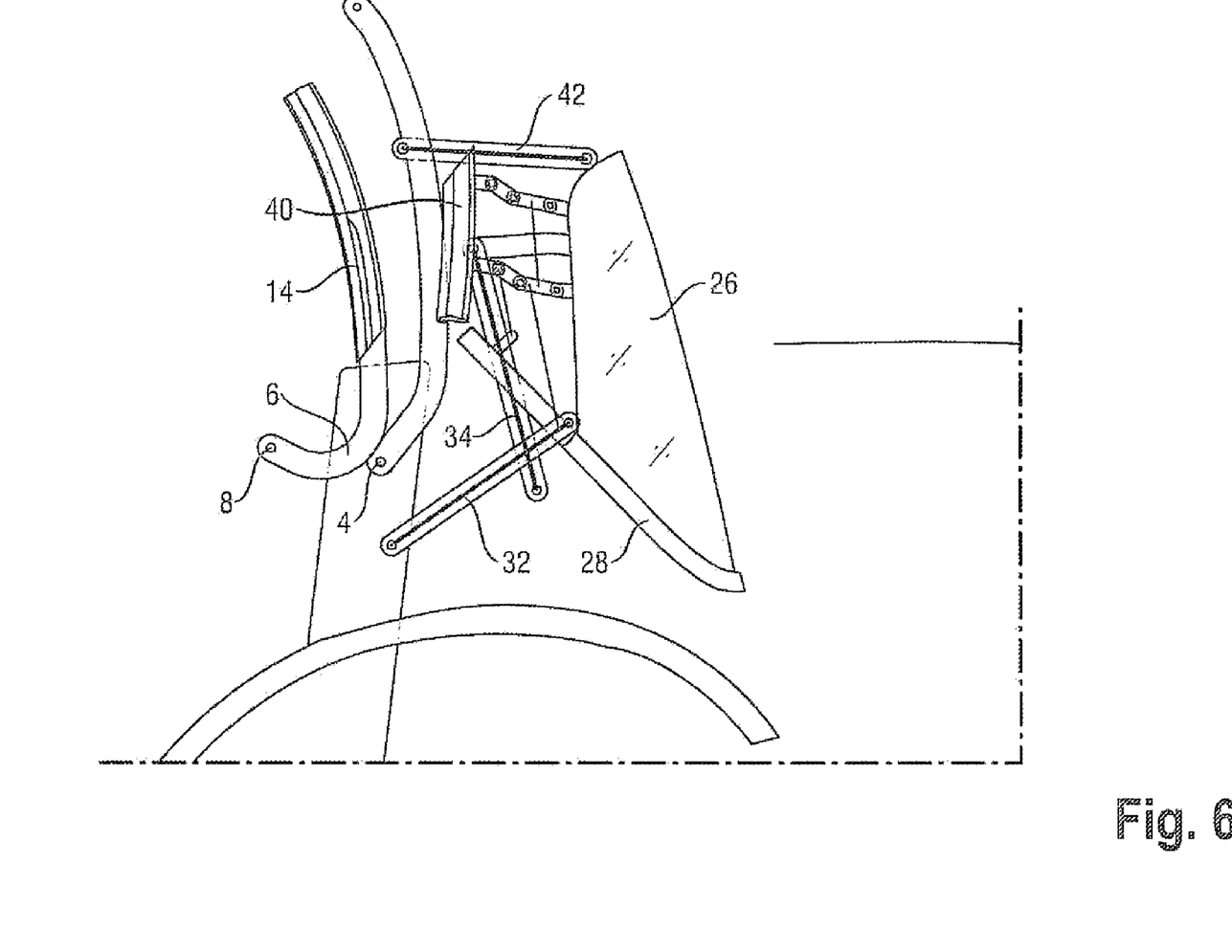
Figure 7:
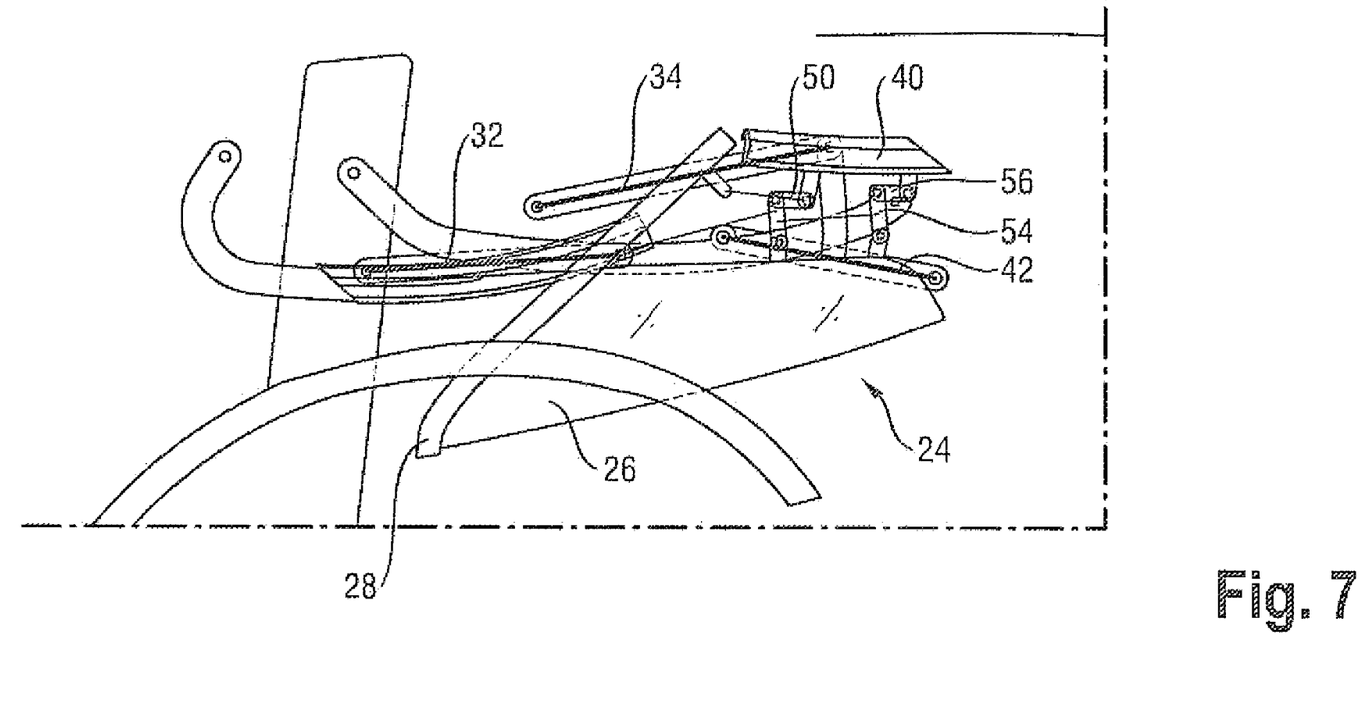

An actuation lever 42 serves as a guide and/or actuator for the pivoting of the rear window assembly 24; the actuation lever 42 is coupled to the first frame part 2 and to the rear window edge at an upper, side portion of the rear window 26. The opening- and closing kinematics of the rear window assembly, which are achieved with the above-described components, are apparent, in particular, in FIGS. 5 to 7. During opening of the top, the rear window assembly 24 moves from its closed position (FIG. 5), in which the lower edge of the rear window 26 and/or the tensioning bow 28 forming the lower edge of the rear window assembly 24 adjoins the rear trunk lid 29, in the clockwise direction rearwardly and downwardly, wherein in the fully-opened, deeply lowered position of the rear window assembly 24 (FIG. 7), in which the rear window 26 has downwardly descended, the second articulated lever 34 is disposed rearward and above the first articulated lever 32 and the actuation lever 42 is disposed below the second articulated lever 34. As is particularly apparent in FIG. 5, in the closed position of the top, the second articulated lever 34 is disposed substantially along a line extending from the line of the frame parts 10, 12, 14, 40.

In the following, a linkage assembly will be described, with which it is ensured that, when the top is closed, the flexible roof covering, which is preferably comprised of textile fabric, is also tensioned in the area between the side edge of the rear window 26 and the edge of the roof projecting therefrom. As is apparent from the example of FIG. 5, the rearmost side frame part 40 is affixed to the adjacent side edge of the rear window 26 by means of, in total, four supporting levers. A first supporting lever 44 is connected via a hinge 46 with a middle portion of the side edge of the rear window 26 and is connected via a hinge 48 with a second supporting lever 50 that is further connected via a hinge 52 with the rearmost side frame part 40.

Figure 5:
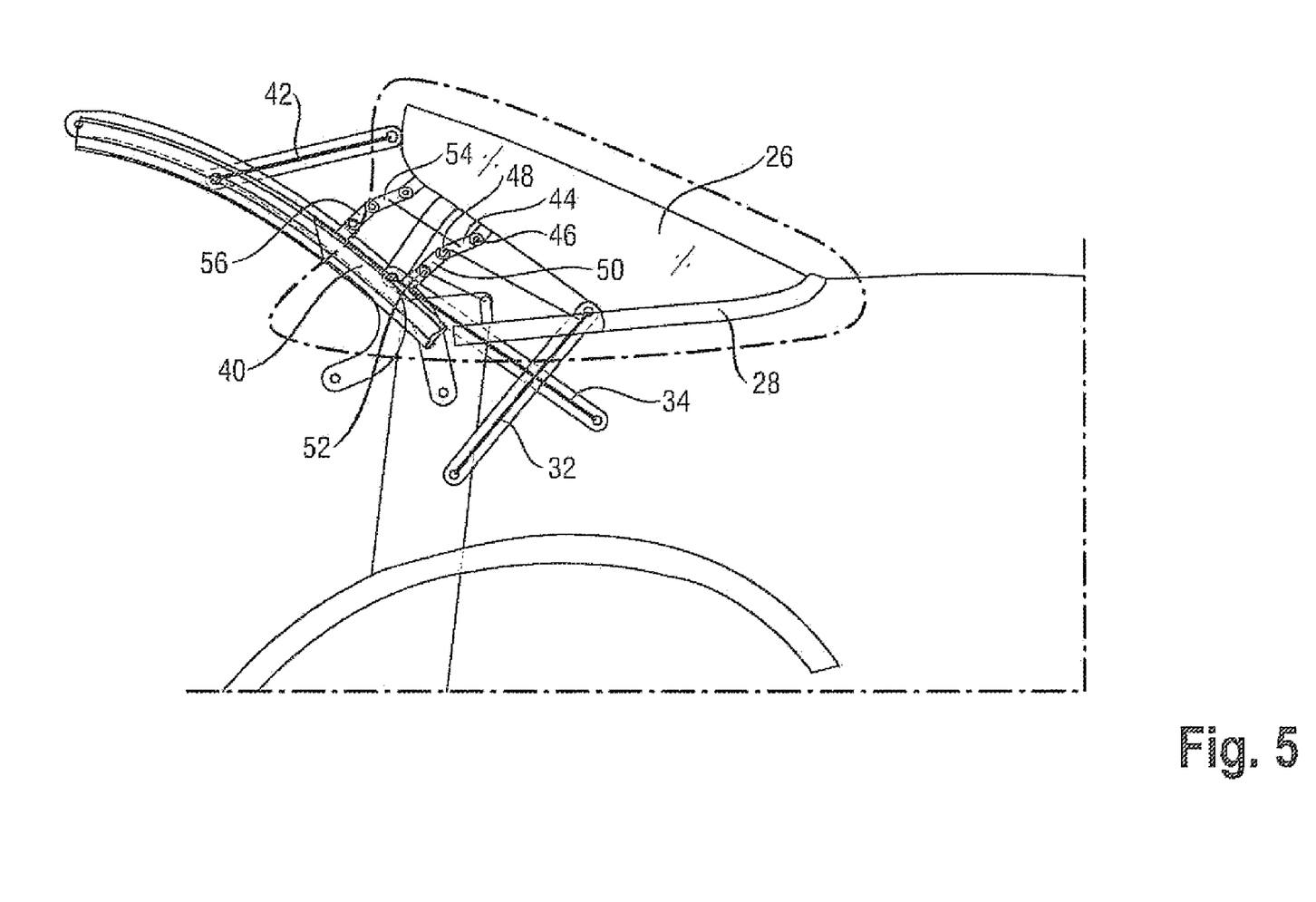
FIGS. 5 to 7 show cut-out A of the top according to FIG. 1 in three different positions with emphasis of the linkage levers and an actuation lever and FIGS. 8 to 10 show the cut-out A of the top according to FIG. 1 in three different positions with emphasis of the control levers.

Two additional supporting levers 54 and 56 are provided spaced from and above the supporting levers 44 and 50; the supporting levers 54 and 56 are borne on the rear window 26, the rearmost frame part 40 and with respect to each other in a manner similar to the supporting levers 44 and 50.

Figure 8:
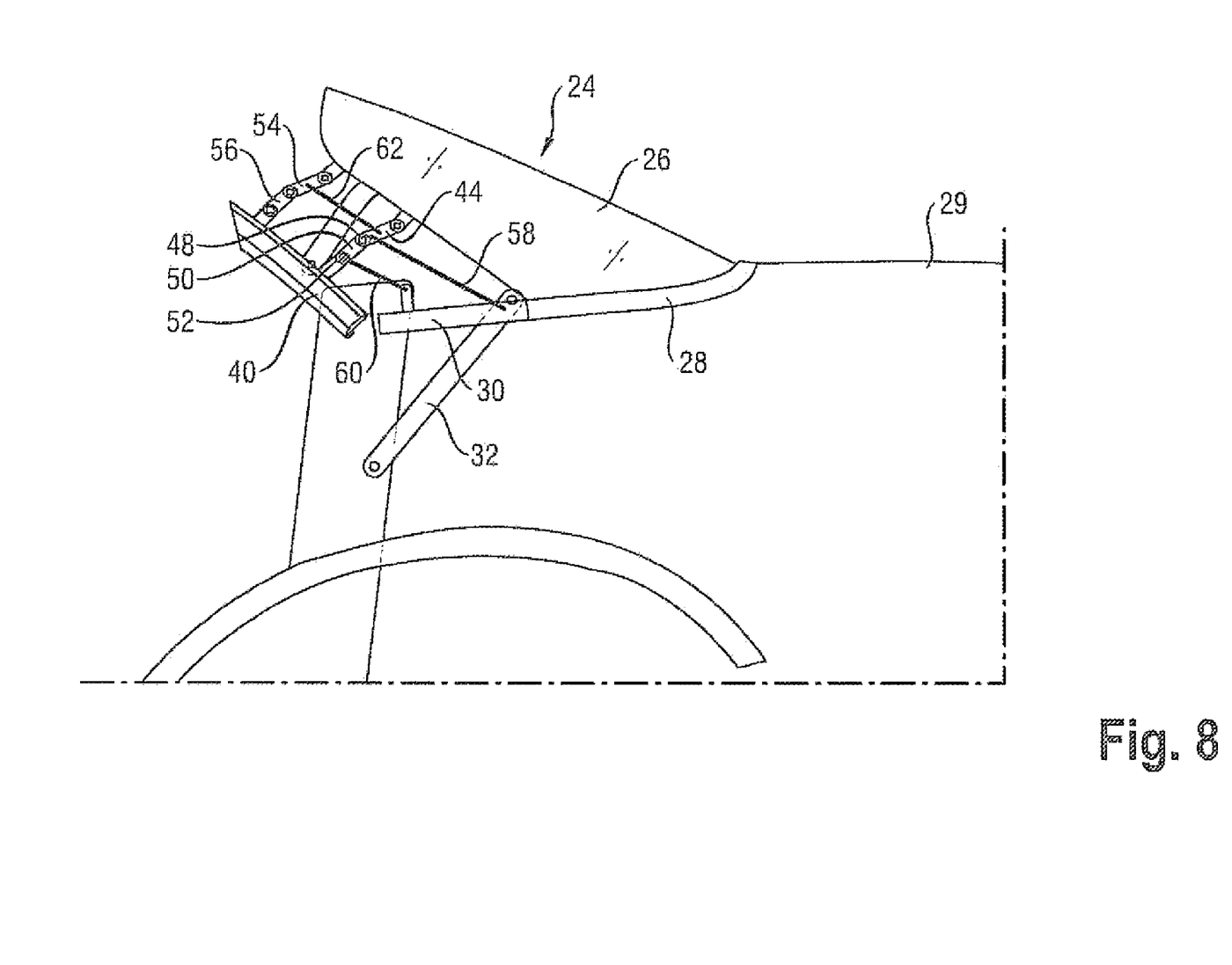
Figure 9:
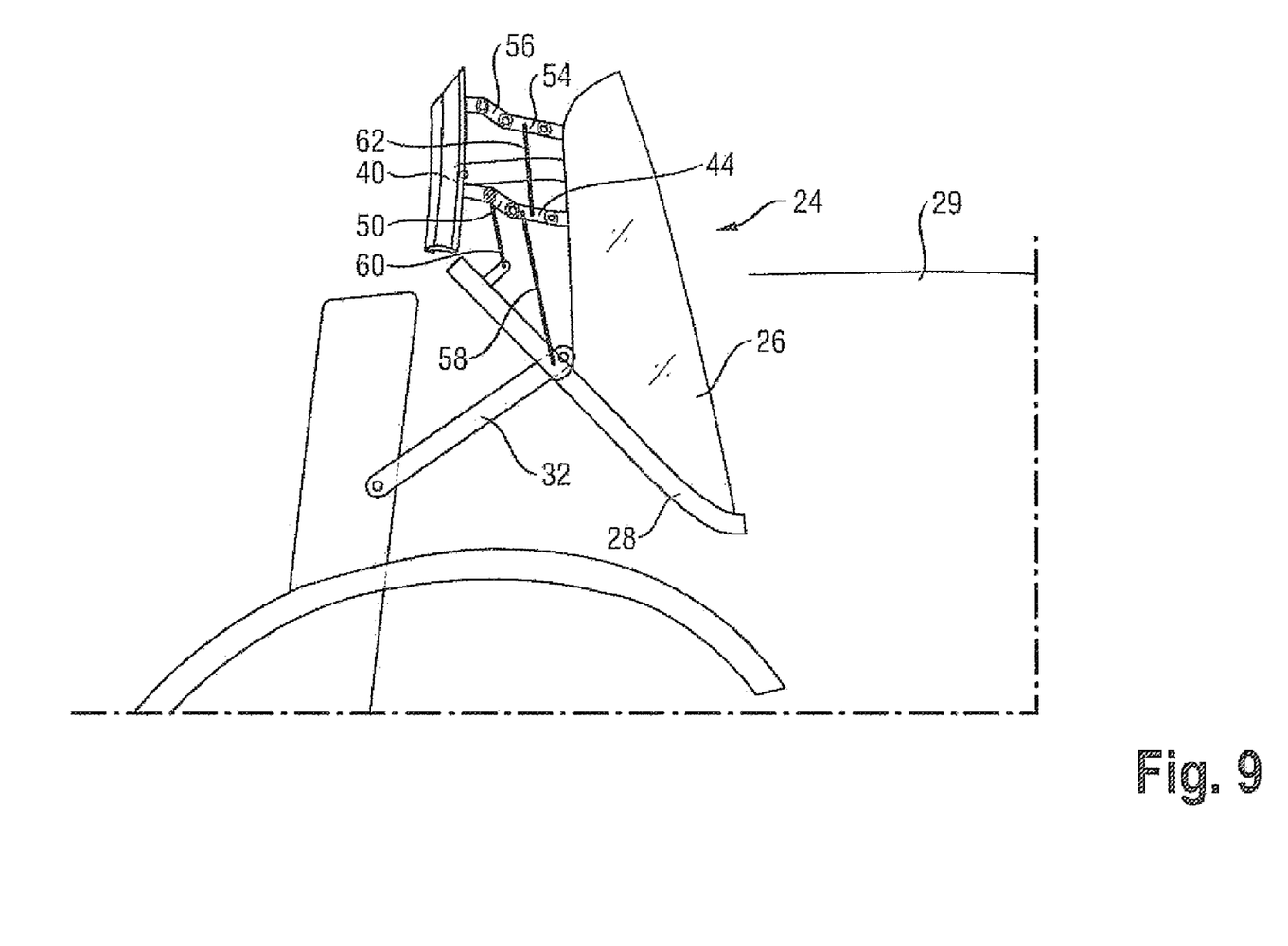
Figure 10:
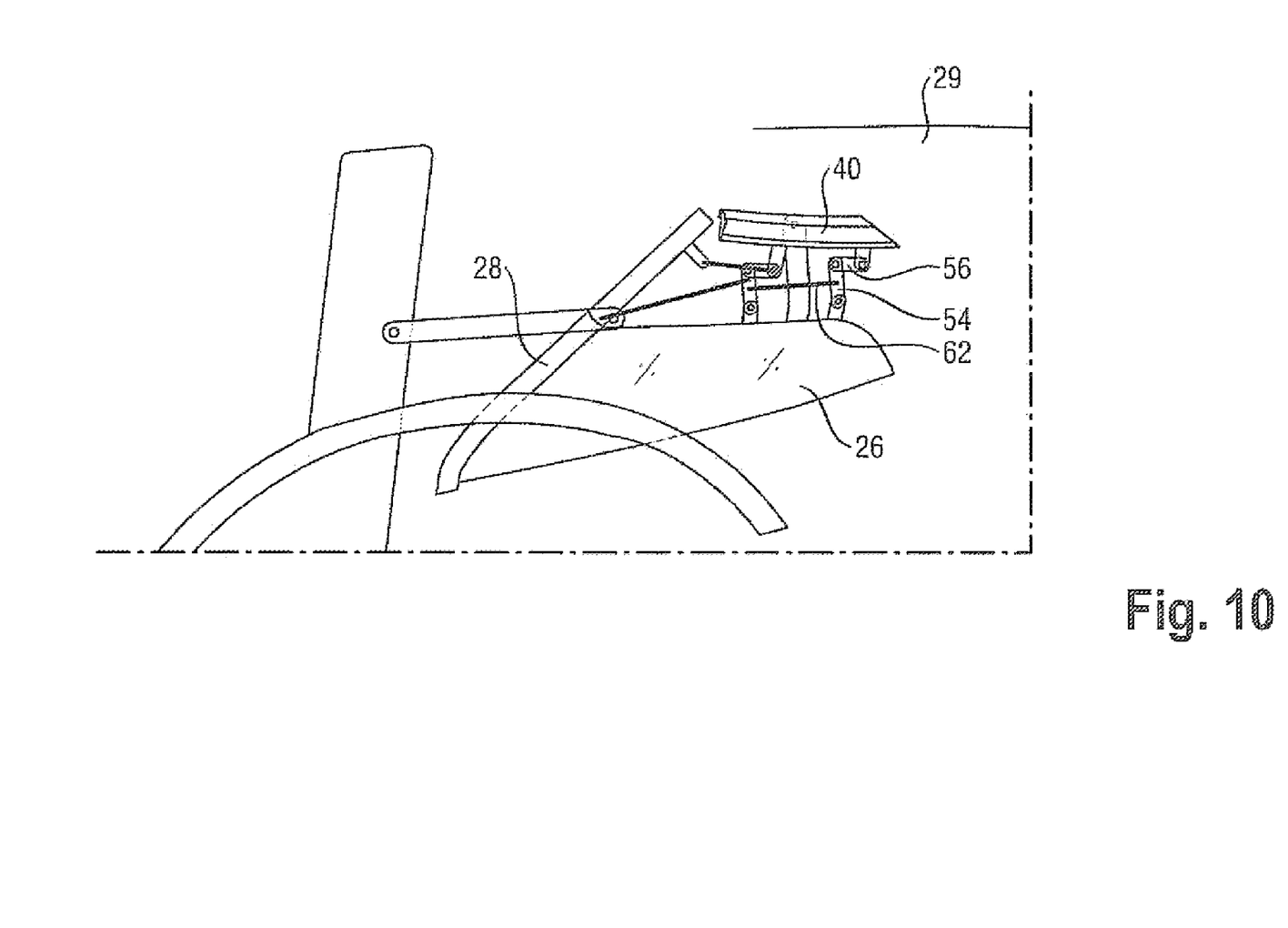

Control levers are provided for guiding the movement of the supporting levers and the rearmost side frame part 40, which control levers are drawn merely as thin lines in FIGS. 1 to 7 and are drawn thickly in FIGS. 8 to 10. A first control lever 58 is borne on the first articulated lever 32 near its bearing on the tensioning bow 28 and on one of the supporting levers 44, 50, preferably at the hinge 48. A second control lever 60 is borne on the forward end portion of the tensioning arm 30, preferably at a rigid bracket connected with the tensioning arm 30, and on the rearmost side frame part 40, preferably at a rigid bracket formed with the side frame part 40, in the hinge 52.

A third control lever 62 is borne on the first supporting lever 44 and on the additional supporting lever 54.

The kinematics achieved with the illustrated supporting levers and control levers will be explained with the assistance of FIGS. 5 to 10:

As is apparent from FIG. 5, the dimensioning and arrangement of the individual levers and their bearings is such that, in the closed state of the top, the supporting levers 44 and 50, as well as 54 and 56, are not exactly located as extensions of each other and/or in a most-extended position (i.e. the supporting levers 44, 50, and 54, 56, respectively, are not oriented in a straight line with respect to each other), in which most-extended position the distance between the rearmost side frame part 40 and the adjacent side edge of the rear window 26 is a maximum; rather, according to FIG. 5, the supporting levers 44 and 54, respectively, are located tilted toward the right with respect to extension lines axially extending from the supporting levers 50 and 56, respectively.

When the top is opened and the rear window assembly 24 according to FIG. 8 is thus pivoted in the clockwise direction, the supporting levers 44 and 50, and 54 and 56, respectively first arrive in the most-extended position and then from this most-extended position arrive in the position shown in FIG. 9, in which the supporting levers 44 and 54 are each located toward the left side with respect to the extension lines axially extending from the supporting levers 50 and 56, respectively. By further opening the top (FIG. 10), the supporting levers 44 and 50, as well as 54 and 56, form an increasingly larger angle with respect to each other, so that the side frame part 40 moves closer to the rear window edge.

With the illustrated kinematics, it is achieved that, during closing of the top, the flexible roof covering, preferably textile fabric, which is affixed to the side- and upper-edge of the rear window 26, to the tensioning arm 30 and to the rearmost side frame part 40 as well as to the enclosing side frame parts 14, 10 and 12, is maximally tensioned between the side edge of the rear window 26 and the side frame part 40 when the supporting levers are located in the most-extended position, shortly before reaching the closed position of the top; the tensioning of the top additionally contributes to the top arriving in the closed position, so that the tensioning is automatically maintained without having to apply, e.g., a powered closing force to the top framework. It is understood that the top framework is preferably designed as a whole such that it passes through an over dead point position shortly before reaching its closed position, in which closed position the frontmost side frame part 12 abuts a not-illustrated windshield frame.

With the illustrated mechanism, not only is a defect-free tensioning of the top cloth material ensured, but also it is ensured that, in the closed position of the top, the rearmost side frame part 40, which is only affixed to the side edge of the rear window 26 and via the control lever 60 to the tensioning arm 30, moves into a position precisely adjoining the adjacent side frame part 14.

The top that is exemplarily illustrated in the figures can be modified in many ways. For example, the rear window 26 as a whole can be provided in a frame that is rigidly or integrally formed with the tensioning bow 28 and that carries the bearing for the supporting levers and is rigidly connected with the bracket 38. Preferably, a panel 64, which is preferably hingedly connected with the tensioning bow 28, is provided inside the tensioning bow 28, which panel forms a hat rack in the closed position of the top and adjoins the space between the lower edge of the rear window and, e.g., a rear seat back of the vehicle. When the top is located in the open position, this panel can be moved in towards the rear window, so that space for accommodating the hinge parts and parts of the roof covering is provided within the rear window assembly 24.

The cloth top can be stored with Z-folding in the opened position of the top or conventionally with storage of the roof top. The roof top can form a hat rack in the opened state of the top.

The rear window 26 can be formed larger than is illustrated in the figures as a panorama window that reaches up to the ends of the tensioning arms. Especially in this case, two supporting levers suffice for securing the necessary top tensioning. The bearing of the rear window assembly on the vehicle body is not required to take place via a four-hinge joint. The bearing can take place with a single rotational axis. The actuation lever 42 is not mandatory; to the contrary, the rear window assembly can also be directly coupled with a drive device. As illustrated, the system can be designed such that the rear trunk lid remains closed when opening the top or opens forwardly in a known manner so that an opening is made available for lowering the top into a top compartment provided in the rear area.

The different levers can be coupled to each other and designed in another suitable manner, so long as the basic concept of the invention is realized, that the top material between the rear window and the adjacent side frame part is tensioned by means of an over dead point mechanism and/or the rear window assembly is retracted into the rear of the vehicle. The roof covering is not required to be entirely flexible; more particularly, the forward area of the roof can also be formed by a rigid panel.

REFERENCE NUMBERS

2 Frame lever
4 Bearing
6 Frame lever
8 Bearing
10 Side frame part
12 Frame part
14 Frame part
16 Flexible roof covering
18 Transverse roof support bow
20 Transverse roof support bow
22 Transverse roof support bow
24 Rear window assembly
26 Rear window
28 Tensioning bow
29 Rear trunk lid
30 Tensioning arm
32 Articulated lever
34 Articulated lever
36 Bearing
38 Bracket
40 Side frame part
42 Actuation lever
44 Supporting lever
46 Hinge
48 Hinge
50 Supporting lever
52 Hinge
54 Supporting lever
56 Supporting lever
58 Control lever
60 Control lever
62 Control lever

The invention claimed is:

1. A folding top for a convertible vehicle, comprising:
a roof covering,
a rigid rear window assembly arranged and constructed to be pivotably borne on a vehicle body, the rigid rear window assembly comprising a rear window,
a foldable top framework having a plurality of side frame parts and being arranged and constructed to be pivotably mountable on the vehicle body rearward of a passenger compartment of the convertible vehicle, wherein the side frame parts are arranged and constructed to support at least a side edge of the roof covering in a closed state of the folding top and wherein the side frame parts are arranged and constructed to move during opening of the folding top such that the side frame parts are at least partially retractable into a rear portion of the vehicle body together with the roof covering and the rear window assembly, and
a linkage connecting the rear window assembly to a rearmost one of the plurality of side frame parts,
wherein a rear area of the roof covering is affixed to an upper edge and a side edge of the rear window and to the rearmost side frame part and wherein at least the rear area of the roof covering is made of a flexible material, and
wherein the linkage is arranged and constructed such that a distance between the rearmost side frame part and the side edge of the rear window passes through a maximum shortly before reaching the fully closed state of the folding top, so that tensioning of the flexible material of the roof covering between the side edge of the rear window and the adjacent side frame part counteracts against an opening of the folding top.

2. A folding top according to claim 1, further comprising an actuation lever coupled between a part of the top framework, which part is arranged and constructed to be pivotably mounted on the vehicle body, and the side edge of the rear window, the actuation lever being arranged and constructed to pivot the rear window assembly in a lower and rearward direction during opening of the top.

3. A folding top according to claim 1, further comprising a four-hinge mechanism disposed on at least one lateral side of the rear window assembly, the four-hinge mechanism being arranged and constructed to pivotably affix the rear window assembly to the vehicle body.

4. A folding top according to claim 3, wherein the four-hinge mechanism includes:

a first articulated lever coupled to a lower edge of the rear window assembly, and a second articulated lever coupled to the side edge of the rear window, wherein a terminal end of the first articulated lever is arranged and constructed to be borne on the vehicle body at a position forward of a position, at which the second articulated lever is arranged and constructed to be borne on the vehicle body.

5. A folding top according to claim 1, wherein the linkage includes:

at least a first supporting lever and a second supporting lever arranged and constructed so as to couple the rearmost side frame part to the side edge of the rear window, wherein the first supporting lever is pivotably connected with the second supporting lever, the first supporting lever is coupled to the side edge of the rear window, and the second supporting lever is coupled to the rearmost side frame part, and the folding top further comprises:

at least one control lever pivotably connected to the rear window assembly and to at least one of the first and second supporting levers, the at least one control lever being arranged and constructed to move through a fully-extended position during closing of the folding top shortly before the folding top reaches the fully closed state.

6. A folding top according to claim 5, further comprising:

a tensioning arm laterally extending from the lower edge of the rear window assembly and projecting substantially forwardly from the side edge of the rear window, third and fourth supporting levers disposed at a distance from the first and second supporting levers, and an additional control lever disposed between at least one of the first and second supporting lever and at least one of the third and fourth supporting levers, wherein the additional control lever is arranged and constructed to move the third and fourth supporting levers during opening of the folding top into a fully-extended position shortly before reaching the closed state of the folding top.

7. A folding top according to claim 5, further comprising a four-hinge mechanism disposed on at least one lateral side of the rear window assembly, the four-hinge mechanism being arranged and constructed to pivotably couple the rear window assembly to the vehicle body.

8. A folding top according to claim 7, wherein the four-hinge mechanism includes:

a first articulated lever coupled to a lower edge of the rear window assembly, and a second articulated lever coupled to the side edge of the rear window, wherein a terminal end of the first articulated lever is arranged and constructed to be pivotably borne on the vehicle body at a position forward of a position, at which the second articulated lever is arranged and constructed to be pivotably borne on the vehicle body.

9. A folding lop according to claim 8, wherein the at least one control lever comprises:

a first control lever connecting at least one of the first and the second supporting levers with the first articulated lever and a second control lever connecting the rearmost side frame part with the lower edge of the rear window assembly.

10. A folding top according to claim 9, further comprising:

a tensioning arm laterally extending from the lower edge of the rear window assembly and projecting substantially forwardly from the side edge of the rear window, third and fourth supporting levers disposed at a distance from the first and second supporting levers, and a third control lever disposed between at least one of the first and second supporting lever and at least one of the third and fourth supporting levers, wherein the third control lever is arranged and constructed to move the third and fourth supporting levers during opening of the folding top into the fully-extended position shortly before reaching the fully closed state of the folding top.

11. A folding top according to claim 10, further comprising an actuation lever coupled between a part of the top framework, which part is arranged and constructed to be pivotably mounted on the vehicle body, and the side edge of the rear window, the actuation lever being arranged and constructed to pivot the rear window assembly in a lower and rearward direction during opening of the top.

12. A folding top according to claim 11, further comprising a hat rack panel provided on the rear window assembly, the hat rack panel being arranged and constructed to form a hat rack when the folding top is disposed in the closed state.

13. A convertible vehicle having a folding top, comprising:

a vehicle body having a passenger compartment and a rear portion arranged and constructed to at least partially accommodate the folding top when the folding top is disposed in an opened state, and wherein the folding top comprises:

a roof covering, a rigid rear window assembly pivotably borne on the vehicle body, the rigid rear window assembly comprising a rear window, a foldable top framework having a plurality of side frame parts that extend longitudinally with respect to each other in a fully closed position of the folding top, wherein a rearmost one of the side frame parts is pivotably mounted on the vehicle body rearward of the passenger compartment, the side frame parts support at least a side edge of the roof covering and the side frame parts are arranged and constructed to move during opening of the folding top such that the side frame parts are at least partially retractable into the rear portion of the vehicle body together with the roof covering and the rear window assembly, and a linkage connecting the rear window assembly to the rearmost side frame part, wherein a rear area of the roof covering is affixed to an upper edge and a side edge of the rear window and to the rearmost side frame part and wherein at least the rear area of the roof covering is made of flexible material, and wherein the linkage is arranged and constructed such that a distance between the rearmost side frame part and the side edge of the rear window passes through a maximum shortly before reaching the fully closed position of the folding top, so that tensioning of the flexible material of the roof covering between the side edge of the rear window and the adjacent side frame part counteracts against an opening of the folding top.

14. A convertible vehicle according to claim 13, further comprising an actuation lever coupled between a part of the top framework that is pivotably coupled to the vehicle body and the side edge of the rear window, the actuation lever being arranged and constructed to pivot the rear window assembly in a lower and rearward direction during opening of the top.

15. A convertible vehicle according to claim 13, wherein the linkage includes:

at least a first supporting lever and a second supporting lever coupling the rearmost side frame part to the side edge of the rear window, wherein the first supporting lever is pivotably connected with the second supporting lever, the first supporting lever is coupled to the side edge of the rear window, and the second supporting lever is coupled to the rearmost side frame part, and the convertible vehicle further comprises:

at least one control lever pivotably connected to the rear window assembly and to at least one of the first and second supporting levers, the at least one control lever being arranged and constructed to move through a fully-extended position during closing of the folding top shortly before the folding top reaches the fully closed state.

16. A convertible vehicle according to claim 15, further comprising a four-hinge mechanism disposed on at least one lateral side of the rear window assembly and pivotably coupling the rear window assembly to the vehicle body, wherein the four-hinge mechanism includes:

a first articulated lever coupled to a lower edge of the rear window assembly, and a second articulated lever coupled to the side edge of the rear window, wherein a terminal end of the first articulated lever is pivotably borne on the vehicle body at a position forward of a position, at which the second articulated lever is pivotably borne on the vehicle body.

17. A convertible vehicle according to claim 16, wherein the at least one control lever comprises:

a first control lever connecting at least one of the first and the second supporting levers with the first articulated lever and a second control lever connecting the rearmost side frame part with the lower edge of the rear window assembly.

18. A convertible vehicle according to claim 17, further comprising:

a tensioning arm laterally extending from the lower edge of the rear window assembly and projecting substantially forwardly from the side edge of the rear window, third and fourth supporting levers disposed at a distance from the first and second supporting levers, and a third control lever disposed between at least one of the first and second supporting lever and at least one of the third and fourth supporting levers, wherein the third control lever is arranged and constructed to move the third and fourth supporting levers during opening of the folding top into a fully-extended position shortly before reaching the closed position of the folding top.

19. A convertible vehicle having a folding top, comprising:

a vehicle body having a passenger compartment and a rear portion arranged and constructed to at least partially accommodate the folding top when the folding top is disposed in an opened state, and wherein the folding top comprises:

a roof covering, a rigid rear window pivotably coupled to the vehicle body via at least a tensioning bow, a foldable top framework having a plurality of side frame parts that extend longitudinally with respect to each other in a fully closed position of the folding top, wherein at least one of the side frame parts is pivotably mounted on the vehicle body rearward of the passenger compartment, the plurality of side frame parts support at least a side edge of the roof covering and the side frame parts are arranged and constructed to move during opening of the folding top such that the side frame parts are at least partially retractable into the rear portion of the vehicle body together with the roof covering and the rear window, and a linkage coupling the rear window to at least a rearmost one of the plurality of side frame parts, wherein a rear area of the roof covering is affixed to at least a side edge of the rear window and to the rearmost side frame part and wherein at least the rear area of the roof covering is made of flexible material, and wherein the linkage is arranged and constructed such that:

the rearmost side frame part is maximally distanced from the side edge of the rear window at an over dead point position located proximal to the fully closed position of the folding top, wherein the flexible material of the rear area of the roof covering is maximally tensioned at the over dead point position, and between the over dead point position and the fully closed position of the folding top, the tension across the flexible material of the rear area of the roof covering causes the folding top to be biased towards the fully closed position of the folding top.

20. A convertible vehicle according to claim 19, wherein the linkage includes:

a first supporting lever coupled to the side edge of the rear window, and a second supporting lever coupled to the rearmost side frame part, wherein the first supporting lever is pivotably connected with the second supporting lever, and the convertible vehicle further comprises:

at least one control lever pivotably coupled to the rear window and to at least one of the first and second supporting levers, the at least one control lever being arranged and constructed to assume a fully-extended position at the over dead point position, and an actuation lever coupled between the at least one side frame part of the top framework that is pivotably coupled to the vehicle body and the side edge of the rear window, the actuation lever being arranged and constructed to pivot the rear window in a lower and rearward direction during opening of the top.

* * * * *